Aug. 9, 1932.  L. W. RAWSON  1,870,649

CENTRIFUGAL CLUTCH

Filed July 17, 1931

Inventor
Louis W. Rawson
By Attorneys

Patented Aug. 9, 1932

1,870,649

UNITED STATES PATENT OFFICE

LOUIS W. RAWSON, OF WORCESTER, MASSACHUSETTS, ASSIGNOR TO WORCESTER POLYTECHNIC INSTITUTE, OF WORCESTER, MASSACHUSETTS, A CORPORATION OF MASSACHUSETTS

CENTRIFUGAL CLUTCH

Application filed July 17, 1931. Serial No. 551,452.

This invention relates to clutches for connecting a driving rotating member to a driven rotating member, and particularly to a type of clutch in which separate sets of centrifugal members are provided on the driving and the driven members, these two sets of centrifugal members becoming operative successively.

It is the general object of my present invention to improve the construction of such clutches by providing improved devices for withdrawing the centrifugal members from operative position when the speed of rotation of either or both members falls below a predetermined point.

My invention further relates to arrangements and combinations of parts which will be hereinafter described and more particularly pointed out in the appended claims.

A preferred form of the invention is shown in the drawing, in which

Figure 1:
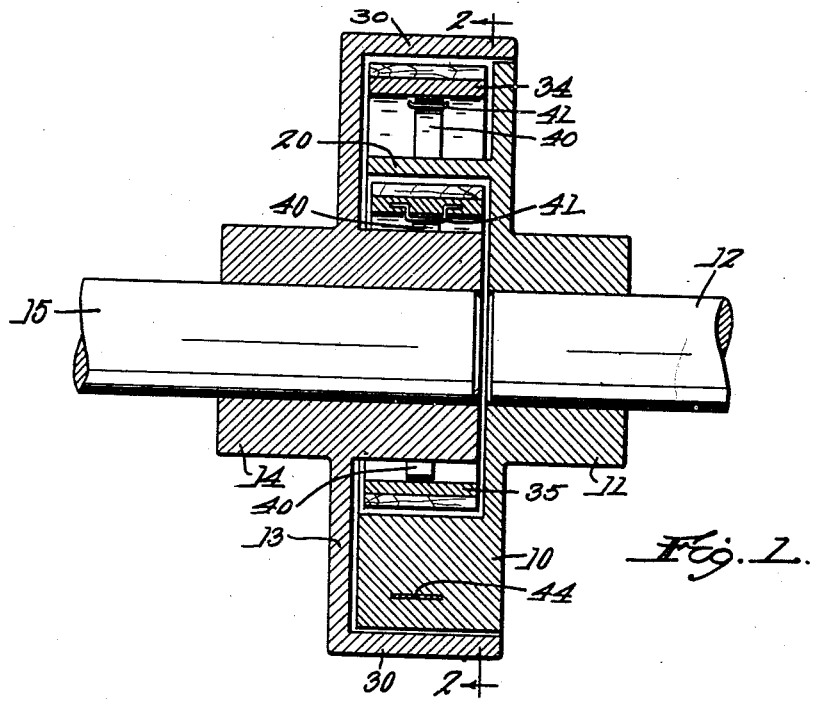
Fig. 1 is a sectional side elevation of my improved clutch.
Figure 2:
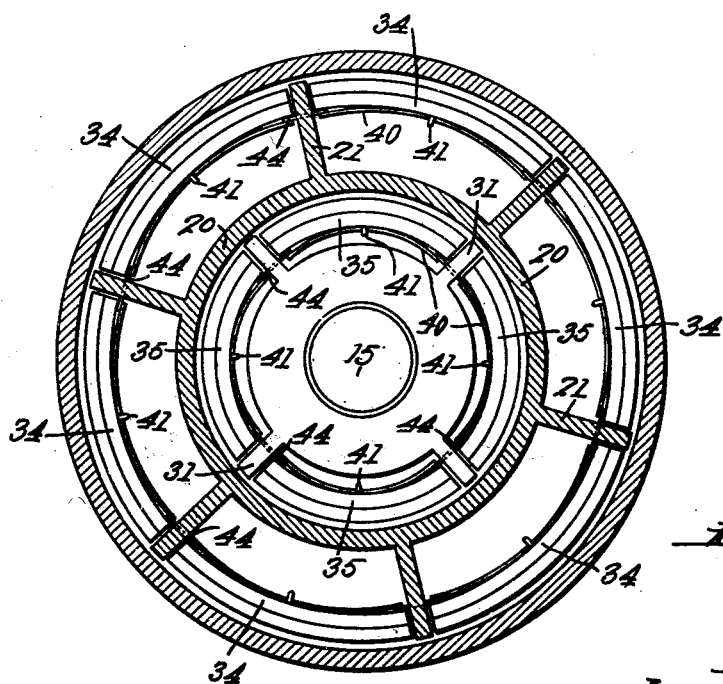
Fig. 2 is a sectional end view, taken along the line 2—2 in Fig. 1.

Referring to the drawing, I have shown a centrifugal clutch comprising a clutch member 10 provided with a hub portion 11 fixed to a driving shaft 12, and a clutch member 13 having a hub portion 14 secured to a driven shaft 15.

The clutch member 10 is provided with an annular flange 20 projecting from the inner face thereof, and with a plurality of radially disposed partition members 21 extending outward from the annular flange 20 and symmetrically spaced about the periphery thereof.

The clutch member 13 is provided with an outer annular flange 30 surrounding the clutch member 10 and is also provided with short radial partition members 31 extending outward from the hub 14 and just clearing the inner surface of the annular flange 20 on the clutch member 10.

Centrifugal members 34 are mounted between the radial partition members 21 on the casing member 10, and centrifugal members 35 are mounted between the radial partition members 21 on the hub 14.

Each centrifugal member 34 or 35 is provided with a leaf spring 40 of resilient sheet metal, which springs preferably extend through wire loops 31 inserted in the members 34 or 35 and preferably secured therein by embedding the loops in the mold before the members are cast, so that the molten metal will flow around the offset ends of the loops and firmly secure the same in position.

The ends of the spring 40 extend under cross plates 44 inserted in the partition members 21 and 31 and preferably secured therein by being cast in position, as previously described for the wire loops 41.

The cross plates 44 serve to tension the springs 40 as the members 34 or 35 move outward under centrifugal force, and they also serve to limit the movement of withdrawal of the members by the springs 40.

It will be noted that the centrifugal members 35 on the driven clutch member 13 are positioned to engage the internal cylindrical surface of the flange 20 on the driving clutch member 10, while the centrifugal members 34 mounted on the driving clutch member 10 are positioned to engage the inner cylindrical surface of the flange 30 of the driven clutch member 13.

Having described the details of construction of my improved clutch, the method of operation thereof is as follows:

Assuming that the driven shaft 15 is standing still and that the driving shaft 12 is placed in rotation, the centrifugal members 34 will be rotated with the shaft 12 and with the driving clutch member 10 until the speed has increased to a point where the centrifugal force developed by the members 34 is sufficient to overcome the tension of their springs 40.

When this speed is reached, the centrifugal members 34 will engage the inner surface of the flange 30 of the driven clutch member 13, thus starting the driven member in rotation.

As soon as the driven member attains a certain predetermined speed, the centrifugal members 35 carried by the driven member will likewise overcome their springs 40, moving out and engaging the inner cylindrical surface of the flange 20 on the driving clutch member 10, thereby increasing the frictional driving strength of the clutch.

If the speed of either the driving or the driven member drops below a predetermined point, the corresponding centrifugal members 34 or 35 will become inoperative and will be drawn inward by the springs 40. The members 34 or 35 are thus held out of contact with the adjacent cylindrical surface, so that there is no drag of the centrifugal members when the clutch is running idle.

In many instances the springs 40 associated with the centrifugal members 35 on the driven member may be omitted, but in other cases it is desirable to use springs on both sets of centrifugal members.

The withdrawal of the centrifugal members at relatively low speeds is particularly important with respect to the members 34 carried by the driving clutch member 10, as in cases where the driving member has both high and low speeds and it is desired to rotate the driven member with the driving member at high speed but to allow the driven member to remain stationary when the driving member is rotated at a predetermined low speed. In such cases, my centrifugal clutch has all of the advantages of an over-running clutch, in addition to its frictional operation.

By selecting springs 40 of suitable size and strength, the critical speed below which the members will be withdrawn may be predetermined as desired.

Having thus described my invention and the advantages thereof, I do not wish to be limited to the details herein disclosed, otherwise than as set forth in the claims, but what I claim is:—

1. A centrifugal clutch comprising a driving and a driven clutch member, each having an axially projecting annular flange, a plurality of radially disposed partitions spaced to form a circular series of pockets on each clutch member, a centrifugal member mounted for outward movement in each pocket by centrifugal force and positioned to engage the inner surface of the flange on the other clutch member when thus moved outward, certain of said members having leaf springs secured to the inner side thereof and cross plates in said partitions extending over and engaging the end portions of the surfaces of said leaf springs and increasing the spring tension thereof as the centrifugal members move outward.

2. A centrifugal clutch comprising a driving and a driven clutch member, each having an axially projecting annular flange, a plurality of radially disposed partitions spaced to form a circular series of pockets on each clutch member, a centrifugal member mounted for outward movement in each pocket by centrifugal force and positioned to engage the inner surface of the flange on the other clutch member when thus moved outward, certain of said members having loops embedded in their inner concave surfaces, leaf springs extending through and secured by said loops and thereby held adjacent said inner surface, and abutments on said partitions engaging the outer end portions only of the outer surfaces of said leaf springs and increasing the spring tension thereof as the centrifugal members move outward.

In testimony whereof I have hereunto affixed my signature.

LOUIS W. RAWSON.